United States Patent [19]
Saylor

[11] 4,214,995
[45] Jul. 29, 1980

[54] OZONE GENERATOR

[76] Inventor: Laurence M. Saylor, 4968 Rickman Rd. NE., Salem, Oreg. 97303

[21] Appl. No.: 737,216

[22] Filed: Nov. 1, 1976

[51] Int. Cl.$^2$ .......................... B01K 1/00; C01B 13/11
[52] U.S. Cl. .................................. 250/539; 204/176; 250/532
[58] Field of Search ................. 250/539, 532; 204/176

[56] References Cited
U.S. PATENT DOCUMENTS

| | | | |
|---|---|---|---|
| 1,403,025 | 1/1922 | Haase | 250/539 |
| 2,093,619 | 9/1937 | Powell | 250/539 |
| 3,205,162 | 9/1965 | MacLean | 204/176 |
| 3,421,999 | 1/1969 | Corwin | 250/539 |
| 3,833,492 | 9/1974 | Bollyky | 204/176 |

Primary Examiner—Benjamin R. Padgett
Assistant Examiner—Deborah L. Kyle
Attorney, Agent, or Firm—Oliver D. Olson

[57] ABSTRACT

An ozone generator comprises a plurality of inner tubular electrodes each of which has a multiplicity of outwardly extending dimpled projections and each of which is configured for a sliding fit within a dielectric carrier sleeve. An outer tubular electrode is mounted coaxially over each carrier sleeve by means of non-conductive spacers and forms an annular air passageway between each outer electrode and sleeve. The assemblies are mounted longitudinally in an enclosed cylindrical housing by means of an air barrier which surrounds the outer electrodes and divides the housing into upper and lower compartments so that pressurized air which is introduced through an air inlet into the lower compartment passes upwardly through the passageways to the upper compartment where it exits the housing through an ozone outlet. Electrical conductors connect the pairs of inner and outer electrodes in parallel across a source of high voltage remote from the housing.

2 Claims, 6 Drawing Figures

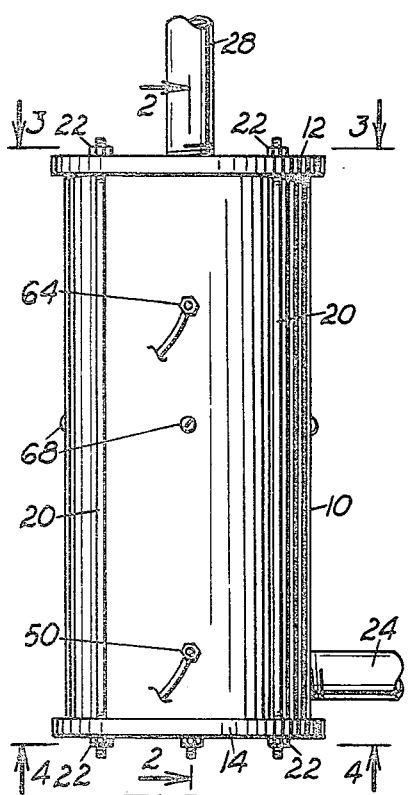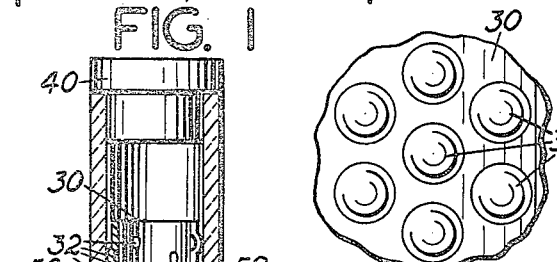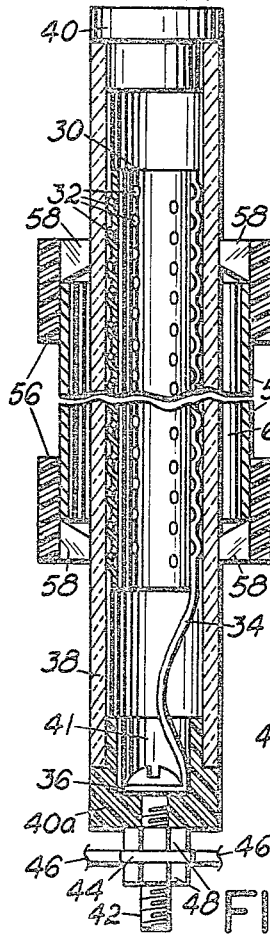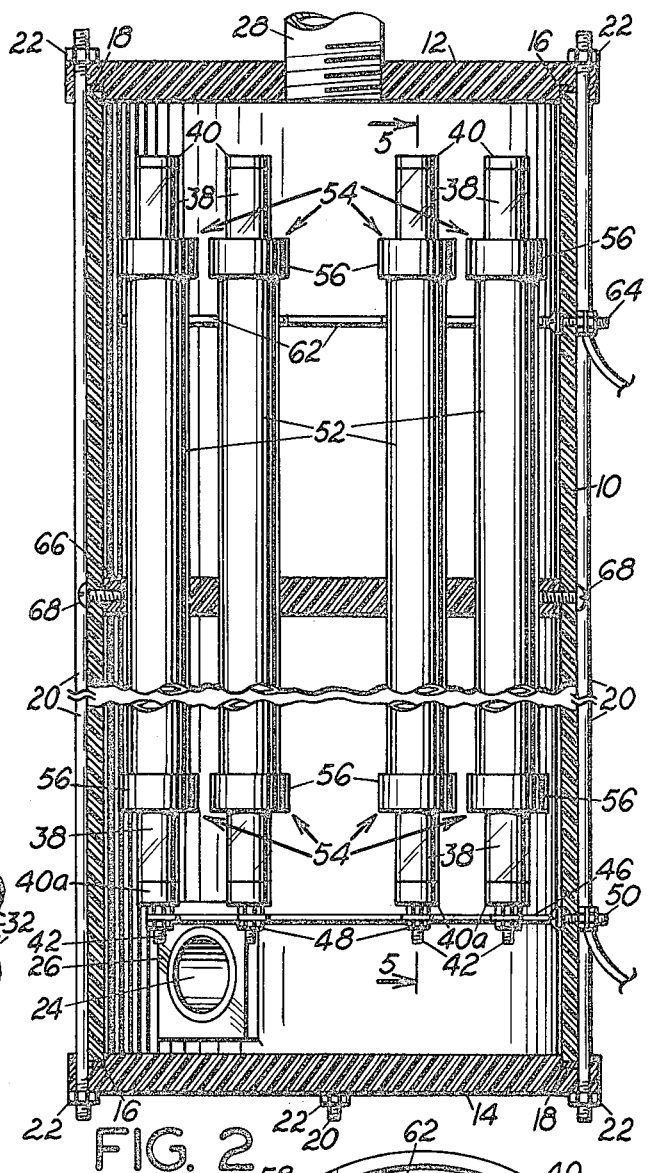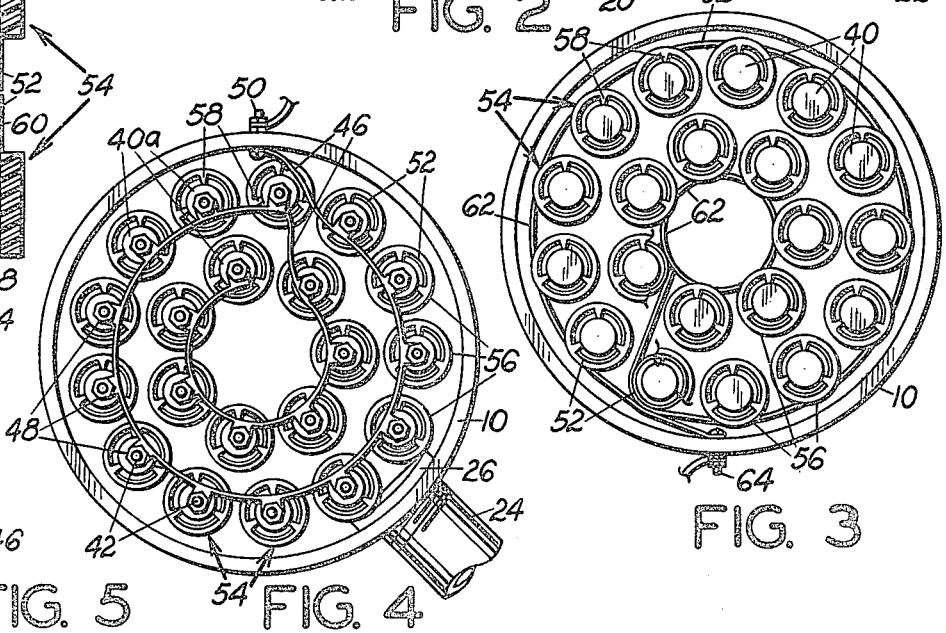

OZONE GENERATOR

BACKGROUND OF THE INVENTION

This invention relates to an ozone generator. In particular, it relates to an ozone generator construction providing maximum efficiency of ozone generation.

Ozone generators operating on the principle of discharging high voltage through a stream of air which is forced along a passageway formed between a pair of tubular electrodes is well known in the prior art. However, in the prior art generators both of the electrodes have smooth surfaces, and therefore, the electric discharge tends to travel down and be concentrated at the downstream end of the tubular electrodes, i.e. the end toward which the air travels.

As a result, the electric discharge dissociates the air at one end of the electrode assembly rather than along its entire length. Thus the assembly is inefficient in its operation of converting oxygen in the air to ozone.

SUMMARY OF THE INVENTION

In its basic concept the ozone generator of this invention provides a pair of tubular electodes one of which has a plurality of dimpled projections located on its surface facing the other electrode of the pair.

It is by virtue of the foregoing basic concept that the principal objective of this invention is achieved, namely, to overcome the aforementioned disadvantages and limitations of ozone generators of the prior art.

Another object of this invention is to provide an ozone generator of the class described having a non-conductive tubular carrier sleeve which is located between the electrodes, forming an air passageway through which all the air passing through the generator must flow so that it is acted upon by the electric discharge.

A further object of this invention is to provide an ozone generator unit of the class described wherein multiple units can be joined in parallel easily for supply from a common source of compressed air.

A still further object of this invention is to provide an ozone generator of the class described which is of simplified construction for economical manufacture and ease of use.

The foregoing and other objects and advantages of this invention will appear from the following detailed description taken in connection with the accompanying drawing of a preferred embodiment.

BRIEF DESCRIPTION OF THE DRAWING

FIG. 1 is a view in side elevation of an ozone generator embodying the features of this invention.

FIG. 2 is a foreshortened sectional view, taken along the line 2—2 in FIG. 1.

FIG. 3 is an end view, looking in the direction of the arrows 3—3 in FIG. 1.

FIG. 4 is an end view looking in the direction of the arrows 4—4 in FIG. 1.

FIG. 5 is a foreshortened sectional view, taken along the line 5—5 in FIG. 2.

FIG. 6 is a fragmentary view, at an enlarged scale, of the inner tubular electrode shown in FIG. 5.

DESCRIPTION OF A PREFERRED EMBODIMENT

Referring to FIG. 1 of the drawing, the ozone generator includes a cylindrical housing 10 in which the operative elements of the invention are located. The housing preferably is formed from an electrically non-conductive material, such as polyvinylchloride, and is shown as being mounted with its longitudinal axis oriented vertically. It is enclosed at its upper end by a circular top 12 and at its lower end by a like-shaped bottom 14. The top and bottom preferably are formed of transparent synthetic resin, as indicated in FIGS. 3 and 4.

The top and bottom both have circumferential grooves 16 formed in their inwardly facing surfaces which are configured for receiving the housing, and gaskets 18 are located within the grooves to seal the housing to the top and bottom. Elongated studs 20, having threaded end portions which pass through openings in the top and bottom, receive nuts 22 at each end for securing the top and bottom to the housing.

An air inlet tube 24 enters the lower portion of the housing adjacent to the bottom for admitting air into the generator. The end of the inlet tube is threaded for engagement into a boss 26 which is joined integrally to the inner wall of the housing. An ozone outlet 28 having a threaded end fits into a threaded opening which is located in the top 12.

Mounted longitudinally in a spaced array within the housing is a plurality of electrode assemblies. In the embodiment illustrated, and best shown in FIGS. 3 and 4, twenty electrode assemblies are arranged in two concentric circular patterns in a six-inch diameter housing. Each electrode assembly includes an inner tubular electrode 30, FIG. 5, formed from a material having high electrical conductivity, such as copper. The electrode has dimpled projections 32 extending outwardly from its outer surface. In the embodiment illustrated, the projections are arranged in longitudinal rows with each row offset from its adjacent row. An electrical lead 34, having an inwardly facing tab 36 with a central opening, extends downwardly from the bottom edge of each electrode 30. Preferably, the projections are stamped into a piece of copper sheet which then is cut and rolled to tubular form of desired size.

Each inner electrode 30 fits slidably within a tubular carrier sleeve 38 which is longer than the electrode and extends beyond the opposite ends thereof. The carrier sleeve is formed from a temperature resistant, dielectric material, such as glass or ceramic, and is closed at its end to protect the electrode from ozone, dust and other contamination. Thus, a plug 40 fits into or over the upper open end of the sleeve. This end of the glass sleeve may be closed by conventional glass blowing techniques, thereby eliminating plug 40. The lower plug 40a also fits into or over the sleeve. As shown, it has a well 41 on its inner end communicating with a medial bore for a bolt 42 which acts as a terminal connector for the electrode 30. Lead tab 36 of the electrode fits into the well 41 and bolt 42 fits through the opening in the tab and extends outwardly of the plug. Clips 44, which are attached to an electrical conductor 46, are fastened to the bolts 42 between nuts 48. The conductor terminates at a post 50 which passes out of the housing 10 for connection of an electrical conductor extending from a source (not shown) of high voltage.

Outer electrodes 52, having inner diameters which are larger than the outer diameters of the carrier sleeves 58, are positioned concentrically over the carrier sleeves. Like electrodes 30, the outer electrode 52 terminate inwardly of the opposite ends of the sleeve 38. The electrodes 52 are formed from a non-corrosive, high electrical conductivity material, such as stainless steel, and preferably have a length which is slightly less than the length of the electrodes 30, whereby the latter extend longitudinally past each end of the outer electrodes 52.

The outer electrodes are mounted coaxially over the carrier sleeves 38 by spacers 54 which are installed on each of their ends. The spacers are formed from an electrically non-conductive material, such as synthetic resin. They comprise annular rings 56 which are configured for sliding engagement with the outer electrode 52. Lugs 58 which extend inwardly from the outer ends of each ring 56, at circumferentially spaced intervals, engage the carrier sleeve frictionally and prevent longitudinal movement of the spacers relative to the sleeve. They also position the outer electrode 52 coaxially on the carrier sleeve. Thus air passageway 60 is formed between the carrier sleeve and the outer electrode.

The outer electrodes are interconnected by electrical conductor 62 which passes out of the housing 10 through post 64.

A circular air barrier 66, formed from a non-conductive material, surrounds the outer electrodes intermediate their ends. The air barrier is secured within the housing 10 by screws 68 so that it positions and supports the electrode assemblies longitudinally in a spaced array within the housing. It is arranged to seal the housing between its ends, causing air which enters the air inlet tube 24 to be passed upwardly only through air passageways 60 to the ozone outlet 28.

In use, cold, dry air is supplied to the air inlet tube 24 of the ozone generator from an external source, such as a roots-type compressor. Because air barrier 66 prevents upward movement of the air in the housing and dust caps 40 and 40a prevent movement of the air through the carrier sleeves 38, all of the air entering the inlet tubes is passed upwardly through the air passageways 60 which are located between the carrier sleeves and the outer electrodes. The air then exists the generator through ozone outlet 28.

High voltage, as from a transformer (not shown) is connected across the ground post 64 and the positive post 50. It will be noted that the capacitance effect of the tubular electrodes 30 and 52 acts to feed back through the transformer and raise the output voltage to an even higher level. For example, if the output from a 7,500 volt transformer is connected across the posts, approximately 12,000 volts differential will be produced.

This voltage, then, is sufficient to produce electrical discharges between the electrodes causing ozone to be formed from the air passing through air passageways 60. However, unlike prior art ozone generators the discharging is not concentrated at a single location at the end of each tube, but is distributed along the tubes, forming at each of the protrusions 32. Thus the discharge is not blown along with the air and acts over a wide area for more efficient operation. Further, since all the air must pass through the air passageways 60 where it is exposed to the multiplicity of electrical discharges, the generator is even more efficient.

It will be apparent to those skilled in the art that various changes may be made in the size, shape, type, number and arrangement of parts described hereinbefore. For example, while the dimpled projections 32 are shown as being located on the outer surface of the inner electrodes 30, alternatively they may be placed on the inner surface of the outer electrodes. Also, while a six-inch diameter housing is shown for accommodating twenty discharge tubes, a larger capacity unit could be utilized. For example, an eight-inch diameter housing will carry forty similarly dimensioned electrode assemblies, doubling the capacity of the generator. In addition, although a single generator is shown for ease of illustration, its arrangement facilitates ganging several units in parallel for servicing by a single air compressor for large scale operation. The air inlet and ozone outlet may be located in the housing at any desired position on opposite sides of the barrier 66, the housing may be disposed horizontally rather than vertically as illustrated, and the system may be reversed, i.e. air may be introduced through tube 28 and ozone taken out through tube 24. Further, the housing may be eliminated, and air introduced into one end of passageway 60 and ozone taken out from the opposite end thereof. The assembly of tubes 30, 38 and 52 may be of any desired length and diameter. These and other modifications may be made, as desired, without departing from the spirit of this invention.

Having now described my invention and the manner in which it may be used, I claim:

1. An ozone generator comprising:
   (a) an elongated hollow housing closed at both ends,
   (b) an air inlet adjacent one end of the housing,
   (c) an ozone outlet adjacent the opposite end of the housing,
   (d) a plurality of elongated electrode assemblies in the housing extending longitudinally therein and spaced apart from each other, and
   (e) an electrically non-conductive air barrier wall disposed transversely within the housing intermediate the ends of the housing and electrode assemblies, forming a seal about the inner wall of the housing and the outer surfaces of the outer electrodes of the electrode assemblies for preventing the passage of air between the spaced electrode assemblies from the air inlet to the ozone outlet,
   (f) each electrode assembly comprising:
      (1) elongated inner and outer electrodes of tubular form disposed concentrically with respect to each other and arranged for connection across a source of high voltage,
      (2) an elongated insulator member of dielectric material of tubular form disposed concentrically between the inner and outer electrodes and forming with one of said electrodes an elongated passageway therebetween communicating at one end with the air inlet end of the housing and at the opposite end with the ozone outlet end of the housing, and
      (3) a multiplicity of spaced protrusions on the surface of one of the electrodes facing the other electrodes, forming a multiplicity of electrical discharge points between said electrodes.

2. The ozone generator of claim 1 wherein the inner surface of the outer electrode and the outer surface of the tubular insulator are smooth, the multiplicity of protrusions project outwardly from the inner tubular electrode of each assembly, the opposite ends of the tubular insulator member are sealed against the entrance of contaminants, and the air passageway is formed between the confronting smooth surfaces of the tubular insulator member and outer electrode.

* * * * *